Oct. 23, 1923.
S. B. SARLES
FLOUR SIFTER
Filed June 1, 1920
1,471,361
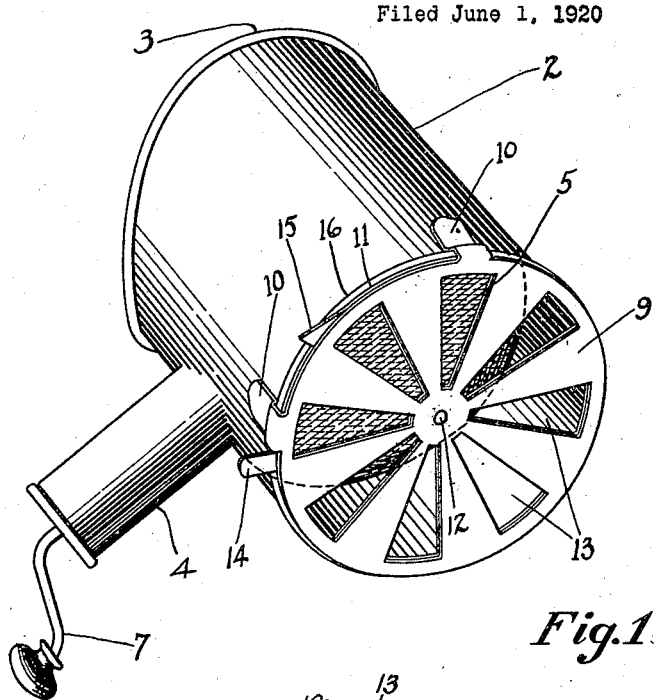
Fig.1
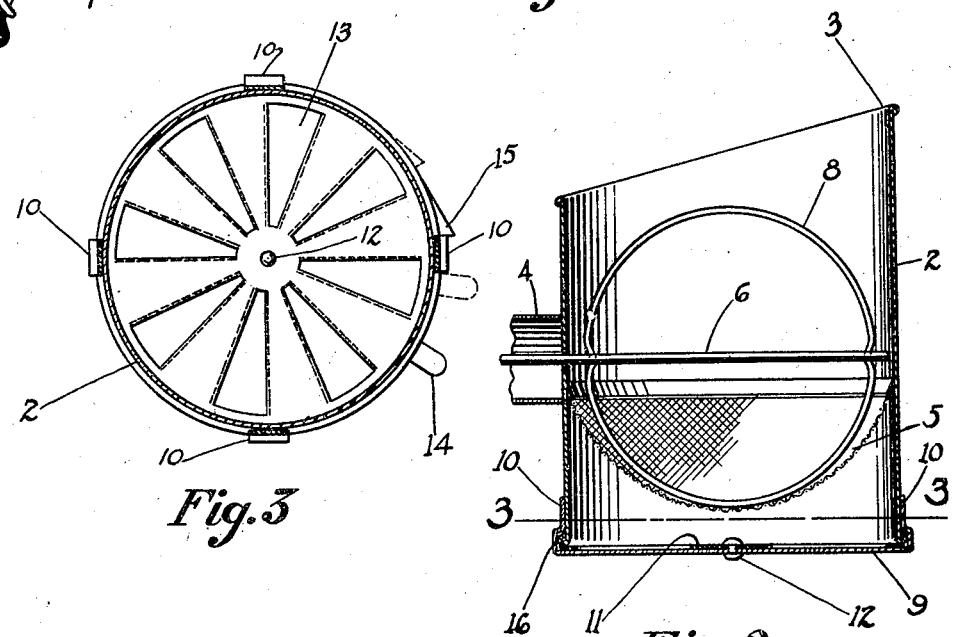
Fig.3
Fig.2
Inventor
Sylvia B. Sarles
By Paul Paul
ATTORNEYS Patented Oct. 23, 1923.

1,471,361

UNITED STATES PATENT OFFICE.

SYLVIA B. SARLES, OF HILLSBORO, NORTH DAKOTA.

FLOUR SIFTER.

Application filed June 1, 1920. Serial No. 385,626.

*To all whom it may concern:*

Be it known that I, SYLVIA B. SARLES, a citizen of the United States, resident of Hillsboro, county of Traill, State of North Dakota, have invented certain new and useful Improvements in Flour Sifters, of which the following is a specification.

Flour sifters as usually constructed have an open bottom through which the flour falls during the sifting operation and the device cannot be laid down upon the table or moulding board without some of the flour falling through and becoming scattered, or more will be delivered than the cook requires.

The object of my invention is to provide an attachment for a flour sifter by means of which the open end can be easily and quickly closed so that the sifter may be placed upon the table or any other suitable support without danger of any of the flour falling out.

The invention consists generally in various constructions and combinations, all as hereinafter described and particularly pointed out in the claims.

In the accompanying drawings forming part of this specification,

Figure 1 is a perspective view of a flour sifter embodying my invention,

Figure 2 is a vertical sectional view of the same,

Figure 3 is a horizontal sectional view on line 3—3 of Figure 2 showing device closed.

In the drawing, 2 represents the cylindrical portion of the sifter, made in the ordinary way, having the scooping lip 3 at one open end and a laterally projecting handle 4. 5 is a sieve of suitable wire mesh, mounted in the cylinder, 6 is a rod having a crank 7 at the end of the handle and provided in the cylinder with agitators 8 which, when the rod 6 is revolved, sweep through the flour and agitate it in the screen and force it through the meshes thereof. The lower end of the cylinder is usually open and the sifted flour is discharged by gravity therethrough. Oftentimes the cook wishes to lay down the sifter while it still contains some of the flour to attend to some other duties pertaining to the cooking operation and this has been difficult because the jar of placing the sifter on the table or moulding has the effect of sifting some of the flour through the screen and sometimes the sifter, although placed very carefully on the table, may be jarred for some reason and considerable of the flour will be shaken out. To avoid this difficulty in the use of the ordinary sifter, I provide a disc 9 secured on the open end of the sifter by suitable means, such as clips 10, which are preferably pressed or punched out of the thin sheet metal of which the disc 9 is composed. A second disc 11 is interposed between the disc 9 and the wall of the sifter and centrally mounted on the disc 9 by means of a pivot pin 12. The two discs have radial openings 13 therein which are adapted to register when the disc 11 is set in one position, but when the said disc 11 is partially rotated, the openings in the disc 9 will be closed and an imperforate bottom formed for the end of the sifter. A lug 14 is provided on the disc 11 forming a convenient finger grip and a stop 15 is also formed on the periphery of the disc 11 in position to contact with one of the clips 10 for limiting the rotation of the disc in one direction while the engagement of the lug 14 with the same clip will limit the movement of the disc in the opposite direction.

I prefer to arrange the parts so that when the lug 14 contacts with the clip the openings in the disc will be fully exposed for the discharge of the flour and when the disc 11 is rotated until the lug 15 contacts with the clip the openings will be closed and further discharge of the flour prevented. A bead 16 is formed on the end of the sifter cylinder, as usually made, and my attachment can be easily slipped into place thereon by pressing the spring clips 10 over the bead so that the shoulders of the clips will snap in the rear of the bead and lock the discs securely on the cylinder. My attachment is therefore applicable to the ordinary sifter by the purchaser and need not be manufactured as a part of the sifter or attached thereto at the factory.

The device may also be readily removed whenever it is desired to obtain access to the sieve or when an unobstructed opening into the cylinder for any purpose is desired.

The disc 11 being between the disc 9 and the wall of the cylinder, it is evident that any accumulation of flour on the disc 9 will be swept into the openings by the rotation of the disc 11.

I claim as my invention:

1. The combination, with a sifter comprising a cylindrical member having an upper filling end, a sifting means intermediate its ends and a suitable handle, the lower end of said member having an encircling bead formed in its wall, a disc having openings therein fitting said lower end and having spring clips to snap over said bead, a second disc also having openings therein and centrally pivoted on said first disc, a finger grip on said second disc, and a stop for limiting the rotation of said second disc, said disc allowing the sifter to be placed upright upon a support when not in use, preventing the premature discharge of its contents.

2. A sifter comprising a sheet metal member having an open end to receive the material to be sifted, and a screen and agitating means mounted intermediate to the ends, an outside hand grip for said member, the lower end of said member having a bead formed in the wall thereof, a cap fitting the lower end of said member and comprising an outer disc having a series of radial openings therein and peripheral spring clips formed to receive said rib and temporarily hold said disc thereon, a second disc centrally pivoted on said first named disc and also having radial openings therein adapted to register with the openings in said first named disc and said second disc having a peripheral lug projecting between said first named disc and said bead to contact with one of said spring clips and form a stop for limiting the movement of said second disc, and a peripheral finger grip provided on said second disc adjacent said handle.

3. The combination with a sifter open at each end and having an intermediate handle and provided with an interiorly arranged sifting means, the discharge end of said sifter being normally open to allow the flow of the sifted material therethrough, and means removably mounted on said discharge end and comprising relatively fixed and rotating members adapted to alternately open and close the passage through said discharge opening, said means allowing said sifter to be placed upright, when not in use, upon a suitable support and preventing the premature discharge of the sifted material through said discharge opening.

In witness whereof, I have hereunto set my hand this 26th day of May, 1920.

SYLVIA B. SARLES.

Witnesses:
O. T. RUDRUD,
ESTHER KNUTH.